Sept. 17, 1957 H. K. SCHILLING 2,806,558
SPEED RESPONSIVE INTERNAL BRAKE
Filed Sept. 27, 1955 3 Sheets-Sheet 1

INVENTOR.
HUGH K. SCHILLING
BY
*Jack N. Nickes*
ATTORNEY

Sept. 17, 1957  H. K. SCHILLING  2,806,558
SPEED RESPONSIVE INTERNAL BRAKE
Filed Sept. 27, 1955  3 Sheets-Sheet 2

INVENTOR.
HUGH K. SCHILLING
BY
Jack N. Wicks
ATTORNEY

Sept. 17, 1957     H. K. SCHILLING     2,806,558
SPEED RESPONSIVE INTERNAL BRAKE Filed Sept. 27, 1955     3 Sheets-Sheet 3

INVENTOR.
HUGH K. SCHILLING
BY
Jack H. Hicks
ATTORNEY

United States Patent Office 2,806,558
Patented Sept. 17, 1957

2,806,558

SPEED RESPONSIVE INTERNAL BRAKE

Hugh K. Schilling, St. Paul, Minn., assignor to Horton Manufacturing Co., Inc., Minneapolis, Minn., a corporation of Minnesota Application September 27, 1955, Serial No. 536,989

5 Claims. (Cl. 188—184)

My invention relates to an improvement in a brake and more particularly to a governor controlled brake having the same torque output in either direction of rotation of the brake assembly with respect to the outer shell when an equal force is applied.

It is an object of my invention to provide a brake which reduces its torque output as the R. P. M. of the brake unit increases. The reduction in torque output is accomplished by the centrifugal force of counterweight means mounted on the brake assembly without continuous adjustment of the applied force as the R. P. M. of the shaft to be controlled increases.

It is a primary object of my invention to provide a brake that has the same total output of force in either direction of rotation of the brake assembly unit for an equally applied force. This is particularly desirable where a brake is required for unwinding large rolls of sheet material in either direction and where the speed of the shaft of the roll continuously increases due to the decreasing size of the roll and a uniform tension on the sheet is required such as in paper and textile mills. The attaining of the same total output of force in either direction of rotation is accomplished by mounting my units in reversed juxtaposition, and with this construction one unit, which is one half of the brake, produces or rotates in one direction at maximum torque output and the other unit, which is the other half of the whole brake unit, operating at minimum torque output. Upon changing direction of rotation of the entire brake unit, the former half unt then operates at its minimum torque and the latter half unit operates at its maximum torque output, the combination of the two units always being the same total output.

The invention will appear more clearly from the following detailed description when taken in connection with the accompanying drawings, showing by way of example a preferred embodiment of the inventive idea wherein like numerals are employed to designate like parts throughout.

In the drawings forming part of this application:

Figure 1 is a perspective view of my brake.

Figure 2 front elevational view with the outer frame removed.

Figure 1:
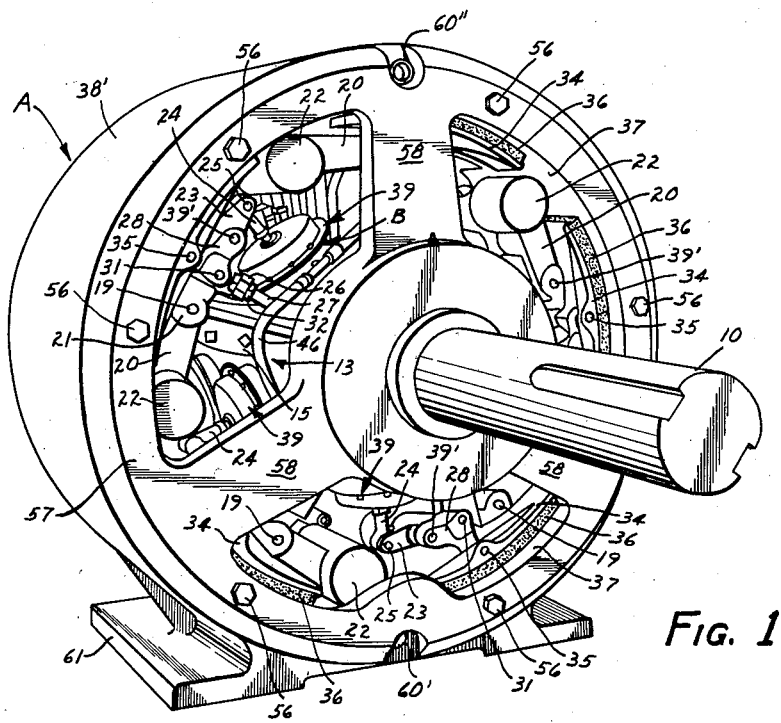

Referring to the drawings in detail, my brake A is composed of the shaft 10 on which are mounted the hubs 11 and 12. Formed integral with the hubs 11 and 12 are the spider members 13 and 13' respectively each formed with the radially extending long arm portions 14 and the radially extending web portions 15. The spider 13 and 13' together with the construction mounted thereon and hereinafter described are identical except that the spider 13' and its component part is secured to the shaft 10 in reversed juxtaposition to the spider 13 as is particularly illustrated in Figure 3.

The hubs 11 and 12 are secured to the shaft 10 by means of the set screws 16 and the common key 17. It is apparent that the hubs 11 and 12 may be formed in one single hub.

The outer ends of the long spider portions 14 are formed with the bearing portions 18 in which the weight pins 19 are positioned. I further provide the weight arms 20 which are formed with the bearing portions 21 having a hole extending therethrough and through which the pin 19 extends to thereby pivotally mount the weight arms 20 on the spider portions 14. The weight arms 20 have formed on the outer ends thereof the weight portions 22 and on the opposite inner ends the bifurcated portions 23. The bifurcated end 23 is pivotally connected to the rod end bearing 24 by means of the pin 25.

The weight arm 20 has formed thereon the extension portion 20' and extending therefrom is the bifurcated end 26 adapted to receive the adjusting screw member 27. I further provide the saddle members 28 which are mounted on both sides of the weight arm 20 and are adjustable with relation thereto as hereinafter pointed out. The saddles 28 have formed therein the recesses 29 which receive the ends 30 of the adjusting screws 27, and the saddles 28 are pivotally secured by means of the pins 31 to the ends 30 of the screws 27. The free ends of the screws 27 are secured to the bifurcated ends 26 by means of the nuts 32. The end 32' of the saddle 28 is pivotally secured to the bifurcated portion 33 of the shoe 34 by means of the pin 35. Secured to the faces of the shoes 34 are the wear resisting shoe face sections 36 which engage the inner surface 37 of the hollow cylindrical casing 38 in the operation of the brake unit.

The saddles 28 are pivoted by means of the pins 39' to the ends of the weight arms 20 so that as the adjustment screws 27 are raised or lowered within the ends 26, the saddles 28 are thereby moved in relation to the weight arm 20 and thus change the position of the shoes 34 in relation to the inner surface 37 of the casing 38' to set the shoes for operation and take-up for any wear on the shoe face sections 36. In the preferred embodiment of our inventive concept I provide a pair of shoes 34. It is apparent that a series of shoes 34 may be provided for additional surface 37.

As a highly effective and positive control of the adjustment of the weight arm 20 and the shoes 34 coacting therewith, I provide the diaphragm rod control unit B which includes the rod member 38 adjustably connected to the rod end 24. The rod member 38 extends outwardly from within the diaphragm housing or shell 39 through the opening 40 formed therein. The shell 39 is composed of the half portions 41 and 42, and the diaphragm 43 is secured between the half shell portions 41 and 42 by means of the screws 44 thus forming the enclosed chamber 45 into which air under pressure is introduced through the air inlet line 46. The chamber 46' which is formed on the opposite side of the diaphragm 43 is open to the atmosphere due to the hole 40.

The diaphragm housing 39 is supported on and secured to the web portion 15 by means of the bolt 47. A spring 48 is placed on the rod 38 and is interposed between the inner surface of the half portion 41 and the diaphragm 43. The washer member 49 is secured to the rod 38 and positioned between the spring 48 and the diaphragm 43 to strengthen the diaphragm centrally and so that it will flex near the outer edges thereof. The end of the rod 38 is secured to the diaphragm 43 by means of the nut 50 forcing the washer 49 against the diaphragm 43. The spring 48 tends to maintain the diaphragm 43 in a position towards the half portion 42 of the housing 39.

The shaft 10 has formed therein the longitudinal air passageway 52 which connects with the transverse passageways 53 which in turn connect with the inlet line 46. The passageway 52 connects with the coupling 54 which remains stationary as the shaft 10 rotates. The amount of air entering the chambers 45 through the lines heretofore mentioned is introduced into the coupling or rotor-seal 54 by means of the supply line 55 which is equipped with a quick on-and-off valve, pressure regulator, and visual air gauge not shown in the drawings so that the brake may be operated remotely through the line 55 and have, at the same time, visual control of the speeds of the brake.

The air pressure may be controlled separately by either the quick control of the on-and-off valve where fine adjustments of the speed of the shaft are not needed or by a screw type regulator valve when fine adjustments in speeds are required. It is thus apparent that my brake operates by means of the air diaphragms 43 actuated by the force of air pressure built up in the chamber 45 of the housing 40 actuating the rod 38 which in turn, through the rod end 24 exerts pressure against the ends 23 of the weight arms 20. The speed of the shaft 10 is governed at given speeds by means of the centrifugal force of the weights 20 against the air pressure in the chamber 45 acting against the diaphragm 43.

In operation air pressure is introduced against the diaphragm 43 to exert enough pressure on the shoes 34 against the inner surface 37 of the casing 38′ so that the shaft 10 will rotate at a desired R. P. M. As the shaft 10 increases in R. P. M., the centrifugal force of the weights 22 increases, and the weights 22 tend to move outwardly of the unit A, and through the weight arms 20 and the members hereinbefore described, the shoes 34 are moved away from the surface 37 thereby decreasing the torque output of the shaft 10.

The cylindrical hollow casing 38′ has secured thereto by means of the bolts 56 the annular members 57. The annular members 57 have formed integral therewith the radially extending web support portions 58 which in turn are integral with the hub portions 59. The shaft 10 is mounted in the hub portions 59 by means of the bearings 60. The hollow casing 38′ formed with the chamber 51 provides a cooling chamber with liquid entering the lower hole 60′ and flowing out of the upper hole 60″ by means not shown. The casing 38′ is secured to the base member 61 to support the same in an upright manner.

Figure 2:
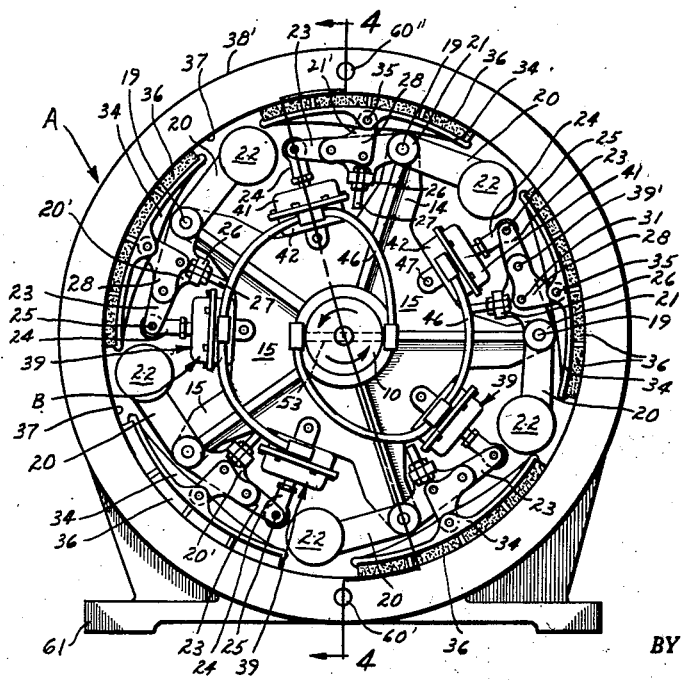
Figure 4:
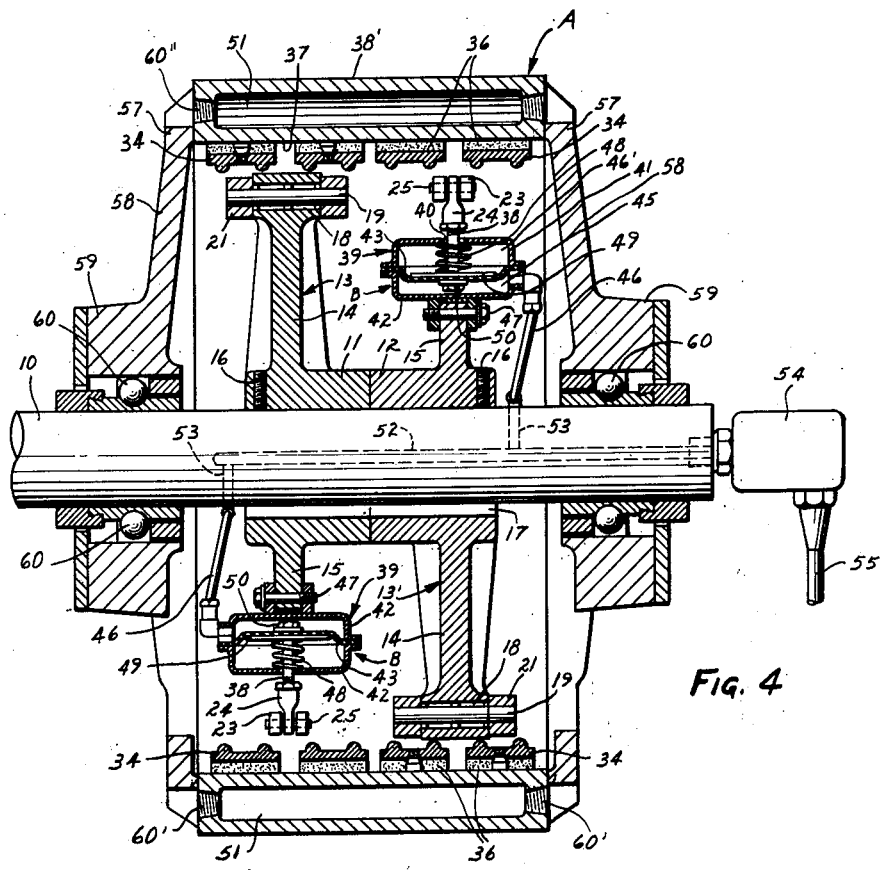
Figure 4 is a sectional view on the line 4—4 of Figure 2.
Figure 3:
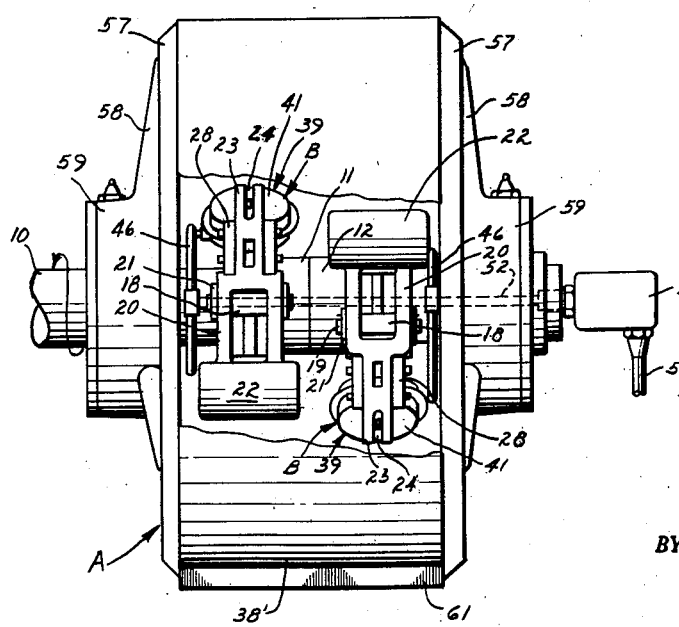
Figure 3 is a top plan view thereof with a portion of the outer casing shell cut away and the brake shoes and linkage therefor removed.
Figure 6:
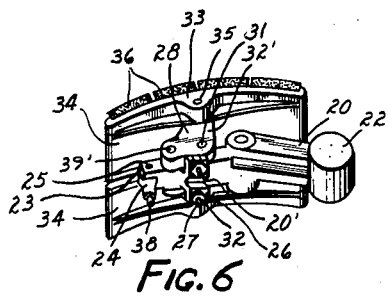
Figure 6 is a perspective view of the brake shoes and linkage mechanism with a single working weight arm.
Figure 5:
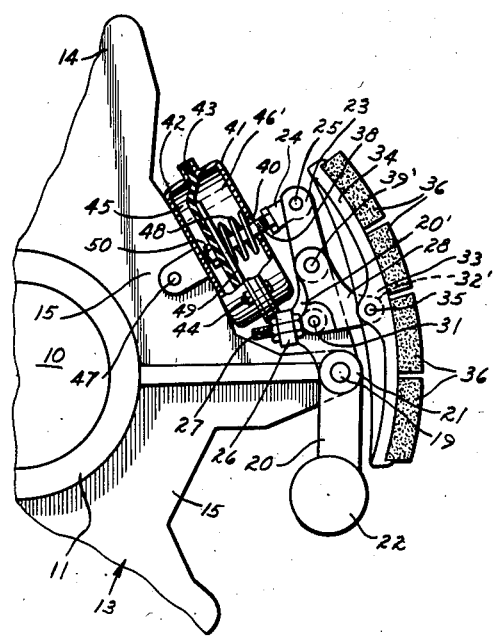
Figure 5 is a detailed partial sectional view of the air diaphragm actuator together with a portion of the brake shoe and linkage mechanism.
Figure 7:
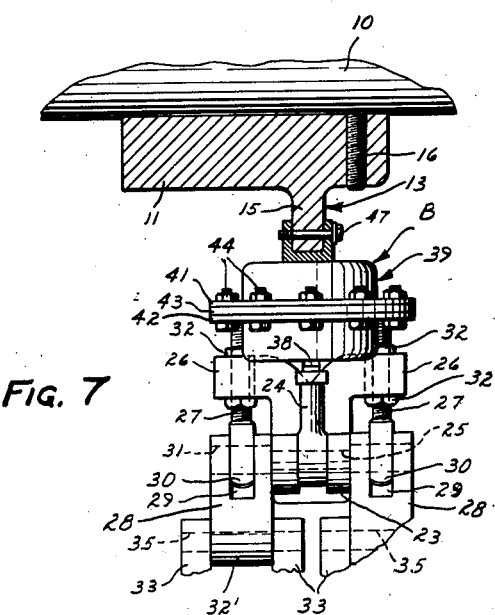
Figure 7 is an additional view of the housing for the diaphragm and a portion of the linkage control for the brake shoes.

With the spider 13 rotating in a counterclockwise direction, as indicated by the arrows in Figures 2 and 3, the highest torque is developed by that spider assembly, and the minimum torque is developed by the spider assembly 13′. The difference in the amount of torque developed is due to the combined pivoting pressure movement of the weight arm, saddle, and shoe linkage assembly towards the surface 37 depending upon the direction the assembly is rotating. However, upon the spider 13 rotating in a clockwise direction, its minimum torque is developed and the maximum torque is developed by the spider assembly 13′. Therefore, it is apparent that the same torque or same total output of force is produced in either direction of rotation of the shaft 10.

With regard to the applied force hereinbefore mentioned, a force of 100 pounds, for example, is exerted against the point 25 by the diaphragm through the rod 24 at 0 R. P. M. This same 100 pound force at 200 R. P. M. is less due to the centrifugal force of the weights 22 transmitted through the arms and linkage heretofore described. As the R. P. M. of the shaft 10 increases, the weights 22 tend to fling outwardly creating a force opposite to that applied through the rod 24, thereby reducing the total force applied through the shoes 34 against the surface 37 with the result of a total decreased torque output of the entire unit without having to reset the force applied to the rod 24 through the diaphragm unit B.

The invention is not to be understood as restricted to the details set forth, since these may be modified within the scope of the appended claims without departing from the spirit and scope of the invention

Having thus described the invention, what I claim as new and desire to secure as Letters Patent is:

1. In a brake, the combination of a cylindrical casing, a shaft rotatably mounted in said casing, a first spider assembly mounted on said shaft, including a series of weighted arms pivotally mounted on said spider member, saddle members pivotally mounted on said weighted arms, brake shoes pivotally mounted on said saddle members adapted to contact the inner surface of said casing, means for adjustably moving the outer ends of said weighted arms to vary the position of said brake shoes with regard to said casing, a second spider assembly substantially identical to said first mentioned spider assembly, mounted on said shaft in reversed juxtaposition to said first mentioned assembly, and means for adjustably moving the outer ends of said weighted arms of both of said assemblies simultaneously to vary the position of said brake shoes with regard to said casing.

2. In a brake, a shaft, an assembly unit including a series of weight arms pivotally mounted on said shaft, brake shoes pivotally mounted on said weight arms, means for actuating said weight arms to move said brake shoes, a second assembly unit substantially identical with said first assembly unit and mounted on said shaft in reversed juxtaposition to said first assembly unit, an outer cylindrical casing having an internal braking surface, means for mounting said shaft and assembly units within said casing whereby said brake shoes may be caused to contact said braking surface.

3. In a brake, a cylindrical casing, a shaft axially mounted in said casing, a hub assembly secured to said shaft, including a series of weight arms pivotally mounted on said hub, a series of brake shoes, means for pivotally mounting said shoes on said weight arms, a second hub assembly secured to said shaft substantially identical with said first mentioned hub assembly and mounted in reversed juxtaposition thereto, and means for actuating all of said brake shoes simultaneously with regard to said casing.

4. In a brake, the combination of a cylindrical casing, a shaft rotatably mounted in said casing, a hub secured on said shaft, a spider assembly connected to said hub, including a series of weighted arms pivotally mounted on said spider assembly, saddle members pivotally mounted on said weighted arms, brake shoes pivotally mounted on said saddle members adapted to contact the inner surface of said casing, a second spider assembly substantially identical to said first mentioned spider assembly secured on said hub in reversed juxtaposition to said first mentioned assembly, and means for adjustably moving the outer ends of said weighted arms of both of said spider assemblies simultaneously to vary the position of said brake shoes with regard to said casing.

5. In a brake, the combination of a cylindrical casing, a shaft rotatably and axially mounted in said casing, a hub secured on said shaft, a spider member connected to said hub and formed with a series of radially extending arms and web portions positioned therebetween, arm members pivotally mounted on each of said radially extending arms and having a weight connected to one end thereof, a series of brake shoes, saddle member pivotally connected to said brake shoes and said pivoted arm members, a second spider member connected to said hub substantially identical to said first mentioned spider member and in reversed juxtaposition thereto and having arm members pivotally mounted on the radially extending arms thereof in reversed position to said first mentioned radial arms, a weight connected to one end of each of said radial arms of said second spider, a second series of brake shoes, saddle members pivotally connected to said second mentioned brake shoes and said second mentioned pivoted arm members, means mounted on said web members of each of said spider members for actuating said pivoted arm members, and means for simultaneously actuating said pivoted arm actuating means to move all of said brake shoes simultaneously relative to said casing.

References Cited in the file of this patent
UNITED STATES PATENTS

| | | |
|---|---|---|
| 1,719,372 | Huck | July 2, 1929 |
| 2,360,141 | Kenney | Oct. 10, 1944 |